United States Patent
Velke et al.

(10) Patent No.: US 6,205,753 B1
(45) Date of Patent: Mar. 27, 2001

(54) POWER LAWN MOWER WITH STAND-ON AND SIT-DOWN MODES

(75) Inventors: James D. Velke, Germantown; William R. Wright, Clarksburg; William D. Patton, Gaithersburg, all of MD (US)

(73) Assignee: Wright Manufacturing, Inc., Gaithersburg, MD (US)

( * ) Notice: Subject to any disclaimer, the term of this patent is extended or adjusted under 35 U.S.C. 154(b) by 0 days.

(21) Appl. No.: 09/412,589

(22) Filed: Oct. 5, 1999

(51) Int. Cl.[7] .......................... A01D 34/03; A01D 34/43; A01D 34/64
(52) U.S. Cl. .............................................. 56/14.7; 56/16.7
(58) Field of Search ..................................... 56/14.7, 15.5, 56/16.7, 15.4, 10.1, 323; 180/6.48, 6.5, 6.62, 19.1, 19.2, 19.3; 280/870.43, 760, 32.7

(56) References Cited

U.S. PATENT DOCUMENTS

| | | |
|---|---|---|
| 3,870,119 | 3/1975 | Wurst . |
| 4,192,525 | 3/1980 | Clark . |
| 4,198,092 | 4/1980 | Federspiel . |
| 4,770,440 | 9/1988 | Lander . |
| 4,878,339 | 11/1989 | Marier et al. . |
| 4,998,948 * | 3/1991 | Osterling ............................... 56/12.6 |
| 5,004,251 | 4/1991 | Velke et al. . |
| 5,307,612 | 5/1994 | Tomiyama et al. . |
| 5,463,853 | 11/1995 | Santoli et al. . |
| 5,507,138 | 4/1996 | Wright et al. . |
| 5,517,809 | 5/1996 | Rich . |
| 5,564,721 | 10/1996 | Wians . |
| 5,600,944 | 2/1997 | Wright et al. . |
| 5,653,466 | 8/1997 | Berrios . |
| 5,765,347 | 6/1998 | Wright et al. . |
| 5,785,453 * | 7/1998 | Marty et al. ............................ 404/94 |
| 5,809,755 | 9/1998 | Velke et al. . |
| 5,809,756 | 9/1998 | Scag et al. . |
| 5,810,371 | 9/1998 | Velke . |
| 5,842,707 | 12/1998 | Smith . |
| 5,865,020 | 2/1999 | Busboom et al. . |
| 5,913,802 | 6/1999 | Mullet et al. . |
| 5,964,082 | 10/1999 | Wright et al. . |
| 5,984,031 | 11/1999 | Velke et al. . |
| 6,059,055 * | 5/2000 | Velke et al. ........................... 180/19.1 |
| 6,085,504 | 7/2000 | Wright et al. . |
| 6,094,897 | 8/2000 | Velke et al. . |

FOREIGN PATENT DOCUMENTS 597049   4/1993   (JP) .

OTHER PUBLICATIONS

"Great Dane Zero Turn Surfer" Technical Manual, dated Mar. 1998.
"Great Dane Zero Turn Chariot" Technical Manual, Dated May 1998.
Excel Compacts 251K/251K T/S/260K T/S (1990).
Excel Hustler 261 (1983).
Excel Hustler 65 and Hustler 36 (1965).

* cited by examiner

Primary Examiner—Robert E. Pezzuto
Assistant Examiner—Arpad Fabian Kovacs
(74) Attorney, Agent, or Firm—Nixon & Vanderhye P.C.

(57) ABSTRACT

A self-propelled power lawn mower for operation by an operator. The operator can operate the mower while standing on a foot platform, or alternatively when sitting down on a selectively deployable seat. Thus, the mower includes both sitting and standing modes. In certain embodiments, at least a portion of the foot platform is located between first and second rear drive wheels. The rear drive wheels are independently driveable in both forward and reverse directions at variable speeds so as to allow for approximate zero radius turning of the mower about a vertical turning axis. The foot platform is positioned near this vertical axis so that the operator when standing may be substantially unaffected by centrifugal force created during approximate zero radius turning of the mower.

20 Claims, 8 Drawing Sheets

POWER LAWN MOWER WITH STAND-ON AND SIT-DOWN MODES

This invention relates to a power driven device. More particularly, this invention relates to a power lawn mower wherein an operator of the mower is capable of sitting down on a seat or standing up on a platform during mower operation.

BACKGROUND OF THE INVENTION

Known commercial power mowers are generally divided into three separate categories: (i) self-propelled walk-behind mowers; (ii) ride-on mowers operated by a seated occupant; and (iii) stand-on mowers operated by a standing occupant.

U.S. Pat. Nos. 5,077,959; 4,967,543; 4,991,382 and 4,920,733 disclose typical walk-behind power mowers, the disclosures of all of theses patents hereby being incorporated herein by reference. U.S. Pat. No. 5,865,020 discloses a known ride-on mower where an operator sits on a seat during mower operation, the disclosure of this patent being hereby incorporated herein by reference. The Great Dane "Zero Turn Chariot" [see May 1998 Technical Manual] is another example of a ride-on mower operated by a seated occupant. U.S. Pat. Nos. 5,964,082; 5,809,755; 5,507,138; 5,600,944; and 5,765,347 disclose stand-on mowers, the disclosures of all of these patents hereby being incorporated herein by reference.

Unfortunately, the operator of a walk-behind mower must walk during mowing operations (unless a sulky is used in conjunction therewith), thereby leading to fatigue. This is a disadvantage of walk-behind mowers, especially in hilly environments. As a result of operator fatigue, mowers controlled by walking operators are generally less productive over extended periods of time.

While ride-on mowers with seats have the advantage of allowing the operator to sit during mowing operations, they may suffer from certain disadvantages. First, a seated operator may have less visibility than a standing operator of trimming areas around shrubs and the like in certain ride-on mowers. Second, it may be more difficult for a seated operator to quickly jump off the mower than for a standing operator to do so. Third, it may be more difficult for a sitting operator to quickly redistribute his or her weight during hilly operations than it is for a standing operator to do so.

It is apparent from the above, that there exists a need in the art for a power lawn mower operable by an operator who can assume a standing position or alternatively a sitting position during operation of the mower. The standing or sitting modes may enable an operator to easily vary his/her weight distribution and/or to have good visibility for trimming around shrubs, trees and the like; and the sitting mode may enable an operator to become less tired during mower operation.

It is a purpose of this invention to fulfill any or all of the above-described needs in the art, as well as other needs which will become apparent to the skilled artisan from the following detailed description of this invention.

SUMMARY OF THE INVENTION

An object of this invention is to provide a mower where the mower operator is capable of standing or sitting during mower operation.

Another object of this invention is to provide a mower where the operator when sitting can alter the weight distribution of the mower forward/rearward so that weight may be transferred from the front to the rear wheels (this may allow for improved hill crossing and may provide added traction on the drive tires/wheels and/or improved control going up or down hills).

Another object of this invention is to provide an elongated seat on a mower wherein the operator can move forward and rearward on the seat so as to change the location of his or her weight distribution.

Another object of this invention is to provide a mower designed so that when going up a hill an operator can move from a sitting position to a standing position so that the overall center of gravity of the mower is moved forward to minimize potential for tipping backward and/or popping a wheely.

Another object of this invention is to provide a mower including arm rests which may be in a deployed position when the operator is in a sitting position and which may be retractable or folded up when the operator moves to a standing position so that the arm rest(s) are less likely to interfere with the operator when in a standing position.

Yet another object of this invention is to provide an operator presence control (OPC) switch that may be activated by the feet and/or hands of the operator, but not only the seat due to a need for standing in certain conditions.

Another object of this invention is to provide spring(s) or other biasing or dampening means for shock absorbing and/or operator comfort purposes associated with the seat of the mower.

Another object of this invention is to provide a seat on a mower, where the seat may be folded up or away to shorten the length of the mower for transport, storage, or when the operator is standing.

Still another object of this invention is to provide a mower including pivoting seat and a foot platform.

Another object of this invention is to provide a mower wherein the seat and/or handle grips are adjustable forward/rearward to accommodate different sized operators or preferences.

Another object of this invention is to provide a mower including wheelie roller(s) to reduce the likelihood of a seat support(s) from digging into the ground and/or minimize wear and tear on the mower.

Another object of this invention is to provide a mower including a seat that is prevented from folding up unexpectedly (e.g. a latch may be unlatched to fold up a seat structure).

Another object of this invention is to satisfy any or all of the above listed objects or needs.

Generally speaking, this invention fulfills any or all of the above described needs or objects by providing a zero radius turning self-propelled lawn mower comprising:

an engine for powering the mower;

first and second rear drive wheels each independently driveable in forward and reverse directions so as to allow for approximate zero radius turning of the mower about a vertical turning axis disposed between said rear drive wheels when said first rear drive wheel is driven forward and said second rear drive wheel is driven rearward at approximately the same speed;

a foot platform for supporting a standing operator, wherein at least a portion of said foot platform is located forward of a rear edge of one of said rear drive wheels;

a seat structure for supporting a sitting operator, wherein at least a portion of said seat is located rearward of said vertical turning axis;

wherein said seat structure is pivotal about a first pivot axis so that said seat structure may be folded up from a deployed position to a stowed position; and wherein the operator may operate the mower when in a sitting position on said seat structure and when in a standing position on said foot platform.

This invention will now be described with respect to certain embodiments thereof, accompanied by certain illustrations, wherein:

DETAILED DESCRIPTION OF CERTAIN EMBODIMENTS OF THIS INVENTION

Referring now more particularly to the accompanying drawings in which like reference numerals indicate like parts throughout the several views.

FIGS. 1–4 and 8 illustrate a zero radius turning self-propelled power lawn mower according to a first embodiment of this invention. An operator 41 of the mower may use the mower either when sitting down on the seat or alternatively when standing up on the foot platform.

Figure 1:
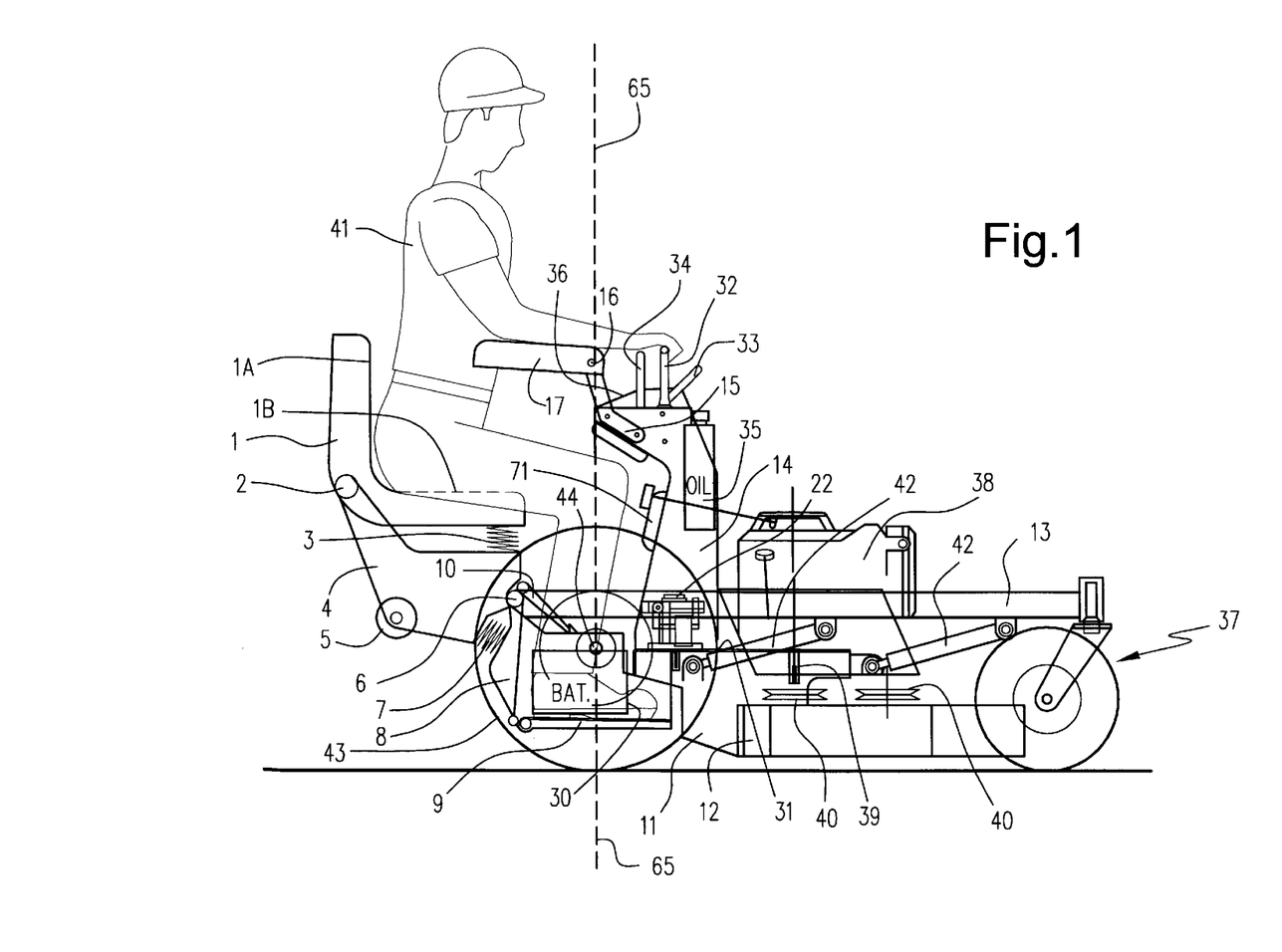
FIG. 1 is a side elevation view of a zero radius turning self-propelled power lawn mower according to an embodiment of this invention, the mower including both standing and sitting modes and this figure showing the operator in a sitting position.
Figure 2:
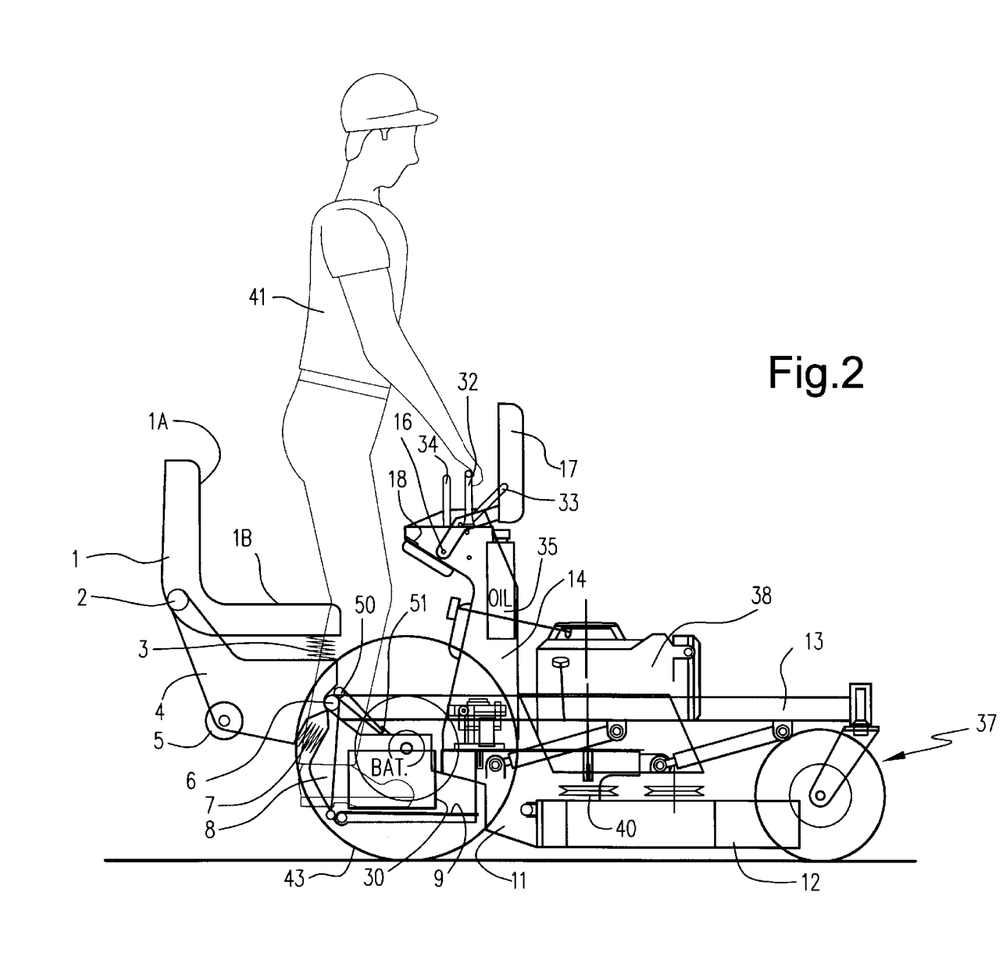
FIG. 2 is a side elevational view of the power mower of FIG. 1, showing the operator in a standing position on a foot platform.
Figure 3:
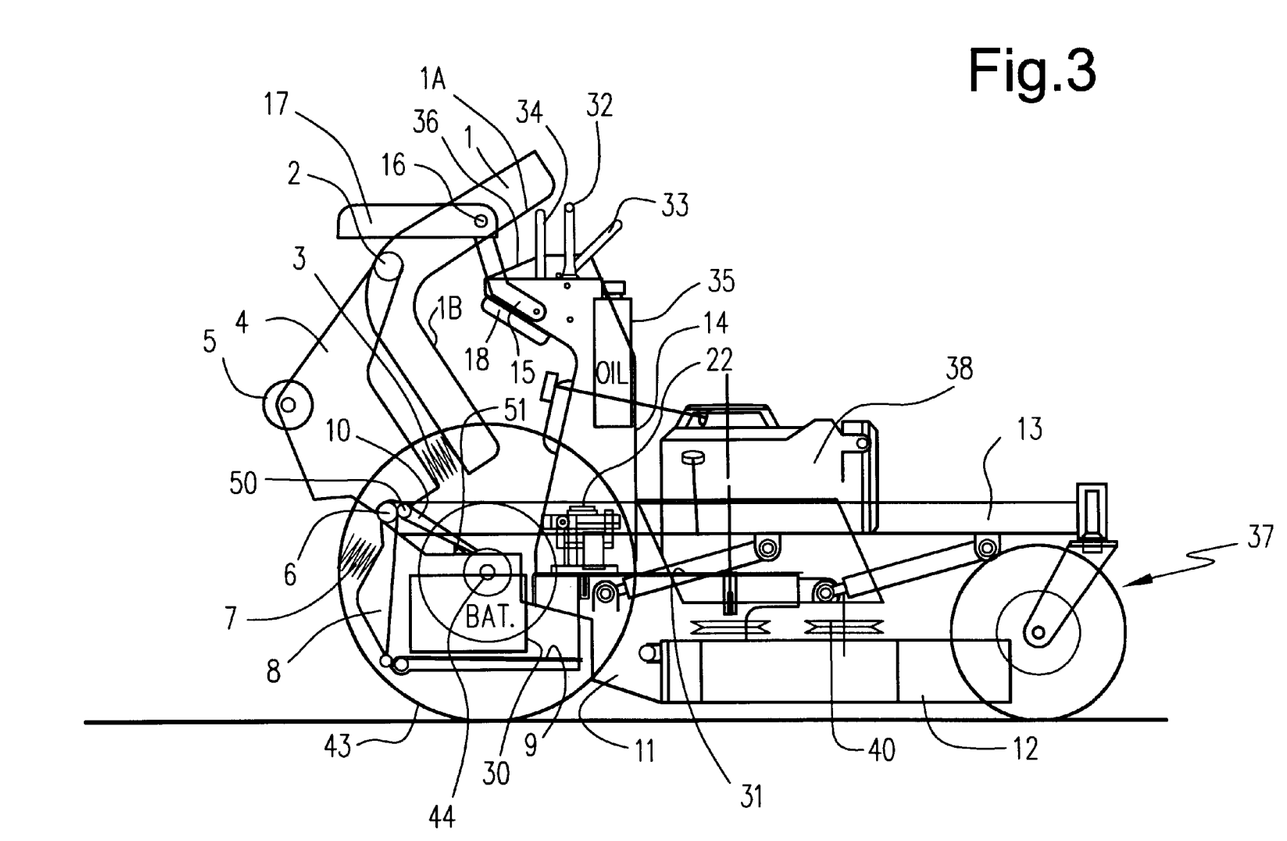
FIG. 3 is a side elevational view of the power mower of FIGS. 1–2, absent an operator and showing the seat folded up.

Referring to FIGS. 1–4 and 8, the lawn mower includes: operator seat 1 for the operator to sit on during mower operation; seat pivot axis 2 about which seat 1 pivots or rotates; spring(s) or shock absorber(s) 3 for dampening the front of the seat for operator 41 comfort; seat support or frame 4; wheelie roller(s) 5 for reducing the likelihood of seat support 4 digging into the ground and/or reducing wear and tear on the mower; pivot axis 6 for enabling seat support 4 to fold up and be biased by spring 7; spring(s) or shock absorber(s) 7 for dampening the rear of seat 1 for operator comfort; upwardly extending spaced apart and parallel supports or frames 8 provided between the operator's legs for supporting seat support 4 and for housing battery 30 or tools therebetween; stationary or pivotal foot platform 9 on which the operator may stand during mower operation; latch 10 for preventing seat 1 from folding up unexpectedly; engine frame weldment 11 connected to cutter or mower deck assembly 12 within which the cutting blades are provided; tractor frame 13 for suspending or supporting cutter deck assembly 12 and engine frame weldment 11; engine deck 31 defining a plane upon which a pair of hydraulic (hydrostatic) pumps 22 and the engine are mounted; a pair of laterally spaced side plates 14 extending upwardly from engine deck 31 so as to support (directly or indirectly) at least (i) normally stationary handle bar 32, (ii) a pair of spaced apart pivotal front handle grips 33 and a pair of spaced apart rear handle grips 34 (each of 33 and 34 comprises both a right handed pivoting grip and a left handed pivoting grip as disclosed and described in U.S. Pat. No. 5,809,755, incorporated herein by reference), (iii) hydraulic oil tank 35, (iv) a pair of spaced apart arm rests 17 that may be padded, (v) a pair of arm rest support brackets 15, (vi) corresponding arm rest pivots 16 for enabling the arm rests to fold up out of the way so that a standing operator can stand on either side of the platform without substantial interference from an arm rest, (vii) pivot stop 18 for arm rest supports 15 to come to rest against when in a deployed position so as to support the arm rests, and (viii) dash board or console 36 including an ammeter (not shown) and/or an hour gauge (not shown); a pair of front casters or wheels 37 supported by frame 13 or alternatively the cutter deck assembly; combustion engine 38 mounted on the plane of engine deck 31; engine shaft 39 extending from the engine downwardly through an aperture in the engine deck 31 for driving the cutter blades via belts and pulleys 40; operator 41 whom may operate the mower either while sitting on seat 1 as shown in FIG. 1 or when standing on platform 9 as shown in FIG. 2; shock absorbers 42 which enable cutter deck 12 and engine deck 31 to move up and down relative to frame 13 and dampen movement therebetween; a pair of independently driveable rear drive wheels 43 which rotate about a common rear drive wheel axis horizontal 44; and right and left hand hydrostatically controlled rear drive wheel motors 45 (see FIG. 8) whose wheel driving direction and speed are controlled by pumps 22 via pivoting handle controls 33 and/or 34 as described in U.S. Pat. No. 5,809,755 (incorporated herein by reference).

In certain embodiments of this invention, engine 42 is moved forward relative to certain conventional mowers so that drive shaft 39 thereof is located forward of the front edge of rear drive wheels 43 and also forward of the front edge of supports 14. Moreover, in certain embodiments, the entire engine 42 is located forward of the front edge of rear drive wheels 43. This forward positioning of the engine permits additional weight to be provided nearer the front of the mower to offset weight distributed by the operator when on seat 1.

The location, function, and structure of platform 9, the hydro pumps 22, and wheel motors may be as shown and/or described in any of U.S. Pat. Nos. 5,765,347 or 5,809,755, both incorporated herein by reference.

Still referring to FIGS. 1–4 and 8, the left rear drive wheel may be driven in a forward direction by one motor 45 while simultaneously the right rear drive wheel is driven in a rearward direction by the other motor 45 at approximately the same speed so that the mower conducts an approximate zero radius turn about a vertical zero radius turning axis 65 that is spaced equal distant between the rear wheels 43 and extends upwardly through common wheel axis 44. The left hand pump 22 is in fluid communication with the left wheel motor 45 so that the left wheel 43 drive direction and speed are controlled by pivoting left hand controls or levers 33 and 34; while the right hand pump 22 is in fluid communication with the right wheel motor 45 so that the right wheel 43 drive direction and speed are controlled by pivoting right hand controls or levers 33 and 34. The right and left rear drive wheels 43 are thus controlled independently from one another in certain embodiments. Each rear drive wheel is mounted on its own drive axle in certain embodiments of this invention. The axle of one wheel 43 may be part of the corresponding wheel motor 45 or alternatively may be separate from the motor. The same is true for the axle of the other rear drive wheel 43. In alternative non-zero radius turning embodiments, both rear drive wheels may be mounted on a single supporting axle.

In zero radius turning embodiments herein, at least a portion of foot platform 9 may be positioned substantially at the vertical zero radius turning axis so that the operator when standing on the platform is substantially unaffected by centrifugal force during zero radius turns of the mower. In other embodiments, platform 9 is positioned relative to handle grips 32–34 so that the operator when standing on platform 9 and gripping a portion of the handle control assembly is substantially unaffected by centrifugal force created during zero radius turns of the mower and at least a portion of his or her body may be on or near (e.g. within six inches of) the vertical turning axis. In certain embodiments, handle grips 32–34 are located forward of the vertical turning axis 65 and the platform rearward thereof so that the operator when standing on platform 9 is substantially unaffected by centrifugal force created during zero radius turns of the mower. In any of the above embodiments, at least a portion (or in some embodiments a substantial portion such as a thigh, head, torso, shoulder, chest, stomach, or the like) of the standing operator's body may be substantially at or near the vertical zero radius turning axis 65 during certain mower operations such as turning.

In certain zero radius turning embodiments, hydrostatic pumps 22 are in conventional communication with hydrostatic motors 45 by way of, for example, a plurality of hydraulic fluid hoses (not shown) disposed between each pump and corresponding motor. Pumps 22 including known swash plates (not shown) generate hydraulic fluid pressure which is translated through one of two hoses connecting each pump 22 to its motor 45. The hydraulic hoses are coupled between each pump 22 and its motor 45 so as to allow hydraulic fluid to flow in both directions between each pump and its motor. One hydraulic hose may be provided for allowing hydraulic fluid to flow in one direction and another hose for permitting the fluid to flow in the opposite direction between a motor 45 and its corresponding pump 22. Each pump 22 includes a conventional pump control lever (not shown) extending therefrom for permitting the standing or sitting operator to control the speed and forward/reverse sense of each rear drive wheel via a hand lever(s) 33–34. Hydrostatic pumps 22 are driven by engine 38 via belts.

Alternatively, rear drive wheels 43 could instead be driven by chains or gears in a known manner, or other variable speed devices.

Still referring to FIGS. 1–4 and 8, seat 1 may include an approximately upright section 1A as well as an approximately horizontal section 1B, so that seat 1 may be approximately L-shaped. The operator sits on portion 1B and may lean backwards against section 1A. As illustrated, seat 1 in certain embodiments is positioned entirely behind the vertically extending zero radius turning axis 65 which extends upwardly through horizontal wheel axis 44. However, grip portions 32–34 of the handle control assembly may be located forward of vertical turning axis 65 so that at least a portion of the operator's body may be on or near this vertical turning axis during sitting or standing operation of the mower, so that the operator is substantially unaffected by centrifugal force created during zero radius turns. As shown in this particular embodiment, when in their deployed positions arm rests 17 are located behind vertical turning axis 65. However, in other embodiments arm rest 17 may be located on or forward of vertical turning axis 65 depending on the preference of the operator or mower designer.

When the operator operates the mower when sitting on seat 1, the center of gravity of the combination of mower and operator is further rearward than when the operator is standing on platform 9. This is because much of the operator's weight is being distributed via seat 1 in sitting modes. Thus, when the operator is sitting on seat 1 during operation, this may provide for improved lateral hill crossing and/or improved traction of rear drive wheels 43. Too much weight at the front of a mower (e.g. on casters 37) may cause a mower to drift down a hill when crossing slopes laterally.

Seat 1 is designed so that seat portion 1B is elongated in forward/rearward directions. Therefore, the operator can adjust the position of his or her weight on the seat at various positions thereby causing the mower's center of gravity to move forward and/or rearward during operation. For example, the operator may sit in the middle of seat 1 during operation of the mower on flat terrain. However, when going down hills, the operator may move or lean rearward in seat 1 and slide as far back as possible in order to put as much weight as possible on the rear drive wheels 43 to reduce the potential for tipping forward when going down a hill. When mowing up hills, the operator may move from a sitting position to a standing position on platform 9 and can lean forward over the handle control assembly in order to put additional weight on the front of the mower thereby reducing the potential of tipping rearwardly when going up hills.

When the operator is standing on platform 9, arm rests 17, if deployed, can interfere with lateral movement of the operator on the platform (e.g. the operator may wish to move to the right or left during side-hill operation to adjust weight distribution). Thus, arm rests 17 may be folded upwardly from their deployed position (see FIG. 1) to a stowed position (see FIG. 2). In order to fold the arm rests 17 up, in certain embodiments the operator simply lifts upwardly on rests 17 so that the rests pivot clockwise as defined in FIG. 1 about pivot axis 16 to a stowed position while supports 15 remain stationary. However, in other embodiments (e.g. see FIG. 2), in order to move arm rests 17 from a deployed to a stowed position the operator rotates both rests 17 and brackets 15 together about a pivot axis to the stowed position as shown in FIG. 2. When the operator sits back down on seat 1 in either embodiment, he or she may also pivot the arm rests 17 downward to their deployed positions for operator comfort during sitting operation.

Springs or shock absorbers 3 and 7 are optionally associated with seat 1 and are provided for operator comfort during sitting modes. At least one spring or other biasing means 3 is positioned proximate and below a front portion of seat 1 to dampen vibration or movement of the front of the seat during mower operation. Spring(s) 3 is generally oriented in a vertical manner with its biasing axis approximately vertical with respect to flat ground on which the mower travels. Meanwhile, at least one spring or other biasing means 7 is provided for dampening movement of a rear portion of seat 1. Spring 7 is oriented at an angle $\theta$ of from about 20°–90° (most preferably from about 30°–60°) relative to the vertical (and thus relative to the axis of spring 3). Seat 1 is mounted on seat support 4. Support 4 and seat 1 may rotate or pivot together about fixed axis 6. Thus, when substantial weight is placed on the rear portion of seat 1, the seat together with support 4 tend to rotate in a counterclockwise direction as defined in FIG. 2 about axis 6. Spring(s) 7 biases support 4 and thus seat 1 against such counterclockwise tendencies, thereby dampening vibration felt by the operator 41 during seated operation of the mower.

Seat 1 may be folded up in certain embodiments in order to shorten the length of the mower for transport and/or storage. For example, seat 1 may be folded from its deployed position (see FIGS. 1–2) to a stowed or folded up position (see FIG. 3). To do this, seat 1 together with support 4 are rotated clockwise about fixed pivot axis 6 from the FIGS. 1–2 position to the stowed FIG. 3 position. In preferred embodiments, pivot axis 6 is positioned forward of the rear edge of rear drive wheels 43 but rearward of common horizontal wheel axis 44, so that the seat assembly when folded upwardly provides for a more compact mower. Pivot latch 10 is provided so that the seat assembly cannot be folded up unexpectedly. For example, as shown in FIGS. 1–2, latch 10 is in a locking position abutting stop 51 thereby preventing seat support 4 from clockwise rotating about axis 6 (latch 10 is connected at its pivot axis 50 to support 4). When it is desired to fold up or stow the seat assembly, latch 10 is rotated in a counterclockwise direction about pivot axis 50 so that its distal end moves away from and/or above stop 51 thereby enabling the seat to be folded up to its FIG. 3 position. When the seat is moved from its stowed position (FIG. 3) back to its deployed position (FIGS. 1–2), latch 10 will automatically move into a locking position where its distal end is resting up against stop 51 as shown in FIGS. 1–2.

An OPC (operator presence control) switch may be associated with platform 9 in certain embodiments of this invention. Such an OPC switch may cause the mower and/or blades to turn off when the operator leaves the platform in certain embodiments. An exemplary OPC switch associated with the platform is disclosed and described in U.S. Pat. No. 5,809,755, incorporated herein by reference. Alternatively, in other embodiments, a similar OPC switch can be associated with the handle control assembly so that the mower engine and/or blades shut off if and when the operator's hands are removed from the handle control assembly during operation. It is preferred that the mower not be equipped with a single OPC switch associated with only the seat, due to the need for potential standing operation during certain conditions.

Figure 4:
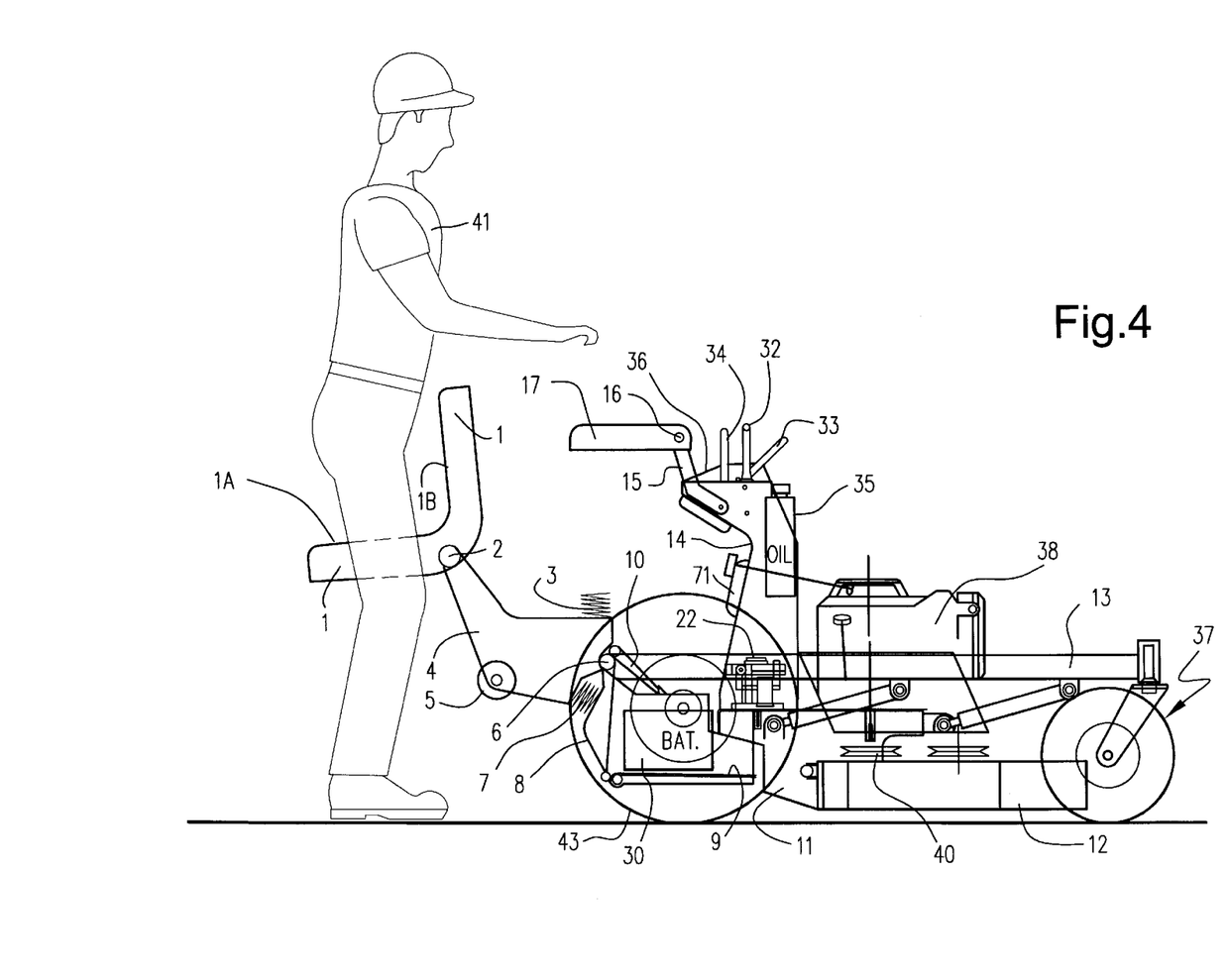
FIG. 4 is a side elevational view of the power mower of FIGS. 1–3, showing an operator getting on or off the mower and the seat pivoted about a pivot as the operator moves forward or backward.

The seat assembly of the mower in FIGS. 1–4 and 8 is designed so that it is easy for an operator 41 to get off of on to the mower. FIG. 4 illustrates an operator either getting on to or off of the mower by allowing seat 1 to pivot about axis 2 as the operator moves either forward or rearward. For example, assuming that the operator 41 is getting on the mower as shown in FIG. 4, the operator 41 straddles portion 1A of the seat with his/her legs, and as the operator moves forward he or she contacts and pushes downward on portion 1B of the seat so that as the operator sits down the seat 1 rotates clockwise about pivot axis 2 until it reaches the FIGS. 1–2 position. Thus, the operator does not have to crawl over an entire seat assembly in order to get on to the mower.

Still referring to FIG. 4, when an operator 41 decides to get off of the mower from a seated position, the operator 41 pushes his or her back rearwardly against the top of seat section 1A thereby causing the seat to rotate counterclockwise about pivot axis 2 into its FIG. 4 position as the operator rearwardly leaves the mower. Again, this enables the operator to get off the mower without having to crawl over top of a fixed seat assembly.

As illustrated in FIG. 4, approximately horizontal pivot axis 2 may be positioned at an elevation at or above the surface of seat section 1B and axis 6 during normal operation (see FIGS. 1–2). Such a positioning of axis 2 makes it less likely for seat 1 to be pivoted counterclockwise about axis 2 unintentionally or accidentally. It is also noted that the two arm rests 17 are supported by and connected to side supports 14 (instead of the seat) so that the arm rests do not interfere with an operator getting on or off of the mower.

The first and second laterally spaced side supports 14 are attached to and extend upwardly from the plane of engine deck 31. In such embodiments, control rods operatively connected to pivoting levers 33–34 may be utilized and extend between the levers and the corresponding pumps 22 to control rear drive wheel direction and/or speed. Such control rods are preferable in embodiments where the elevation of pumps 22 remains constant relative to the elevation of the handle control assembly 32–34 during mower operation and at different blade cutting heights.

Figure 7:
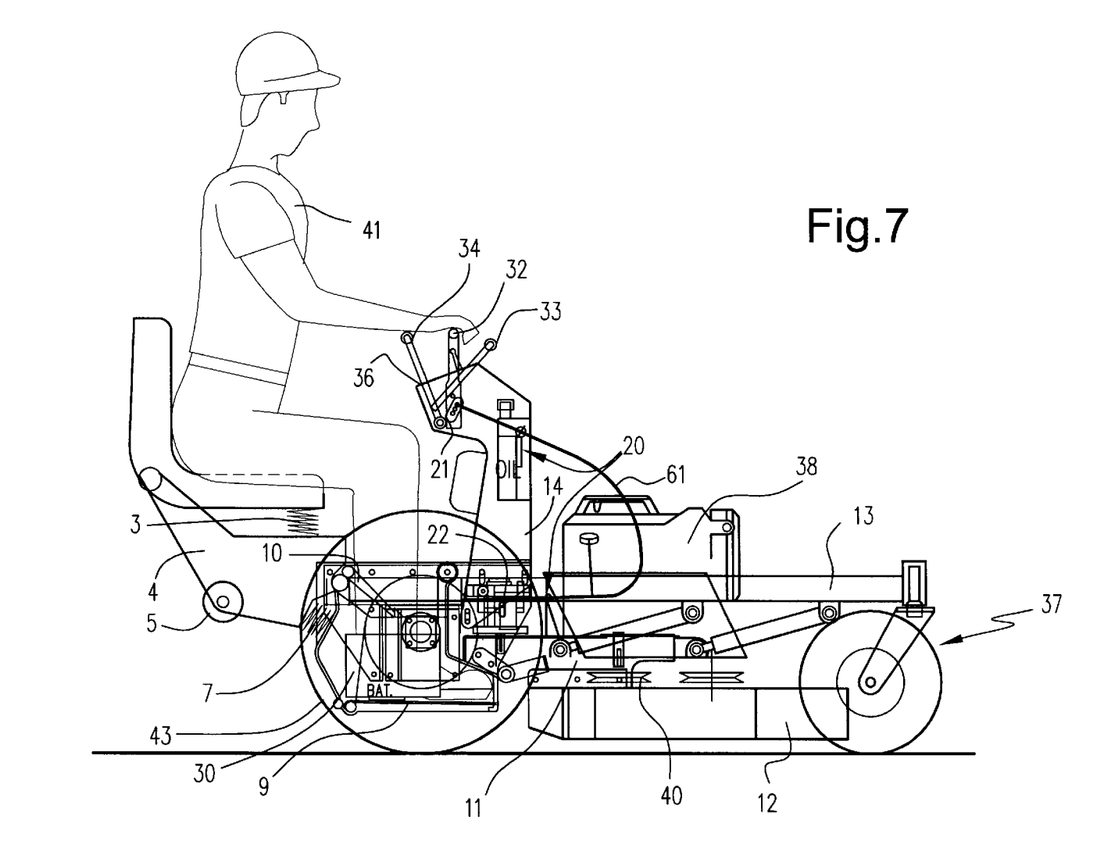
FIG. 7 is a side elevation view of a zero radius turning self-propelled power lawn mower according to still another embodiment of this invention, the mower including both standing and sitting modes, and control cables, this figure showing the operator in a sitting position.
Figure 8:
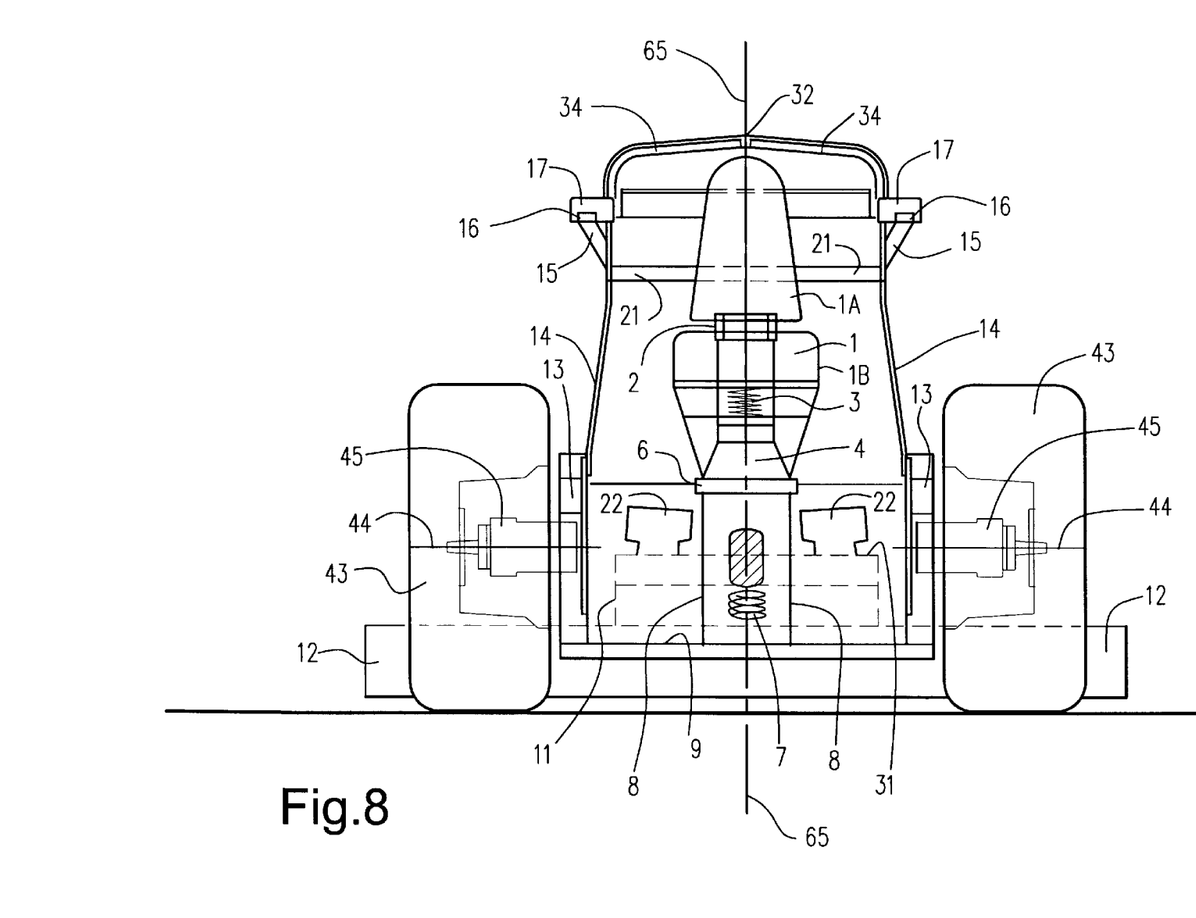
FIG. 8 is a rear elevational view of the mower of FIGS. 1–4, absent an operator.

FIG. 7 illustrates another embodiment of this invention, wherein first and second elongated flexible control cables 61 replace the above-described control rods. First and second similar cables 61 extend between levers 33–34 and the corresponding pumps 22, thereby allowing pivoting movement of levers 33–34 to control the speed and/or drive direction of rear drive wheels 43. Cables 61 are preferred in the FIG. 7 embodiment, because the elevation of the engine deck 31, cutter deck 12, and pumps 22 is/are adjustable upwardly and downwardly relative to the height of the handle control assembly 32–34. This is because the engine deck upon which engine 38 and pumps 22 are mounted is suspended from frame 13 and is adjustable upwardly and downwardly along with cutter deck 12 relative to the frame 13 in order to adjust the cutting height of the mower. In the FIG. 7 embodiment, no arm rests are provided.

Cables 61 of the FIG. 7 embodiment are push/pull type cables which act similar to flexible rods and are resistant to buckling. When cables 61 are pushed forward or downward by forward pivoting of either lever 34 or lever 33, this causes a pushing force also to be applied to pump 22 in a direction going toward the rear of the mower as shown in FIG. 7. Cables 61 are preferred when the handle control assembly 32–34 is mounted at an elevation independent from and variable relative to the height of the engine deck 31 and thus pumps 22. Here, the engine deck 31 and pumps 22 move upwardly and downwardly with cutter deck 12 in order to adjust the cutting height, while the handle control assembly does not move up and down along therewith. In certain embodiments, sheath holders may be provided in order to cover and enclose cables 61 throughout portions of or their entire respective lengths.

Figure 5:
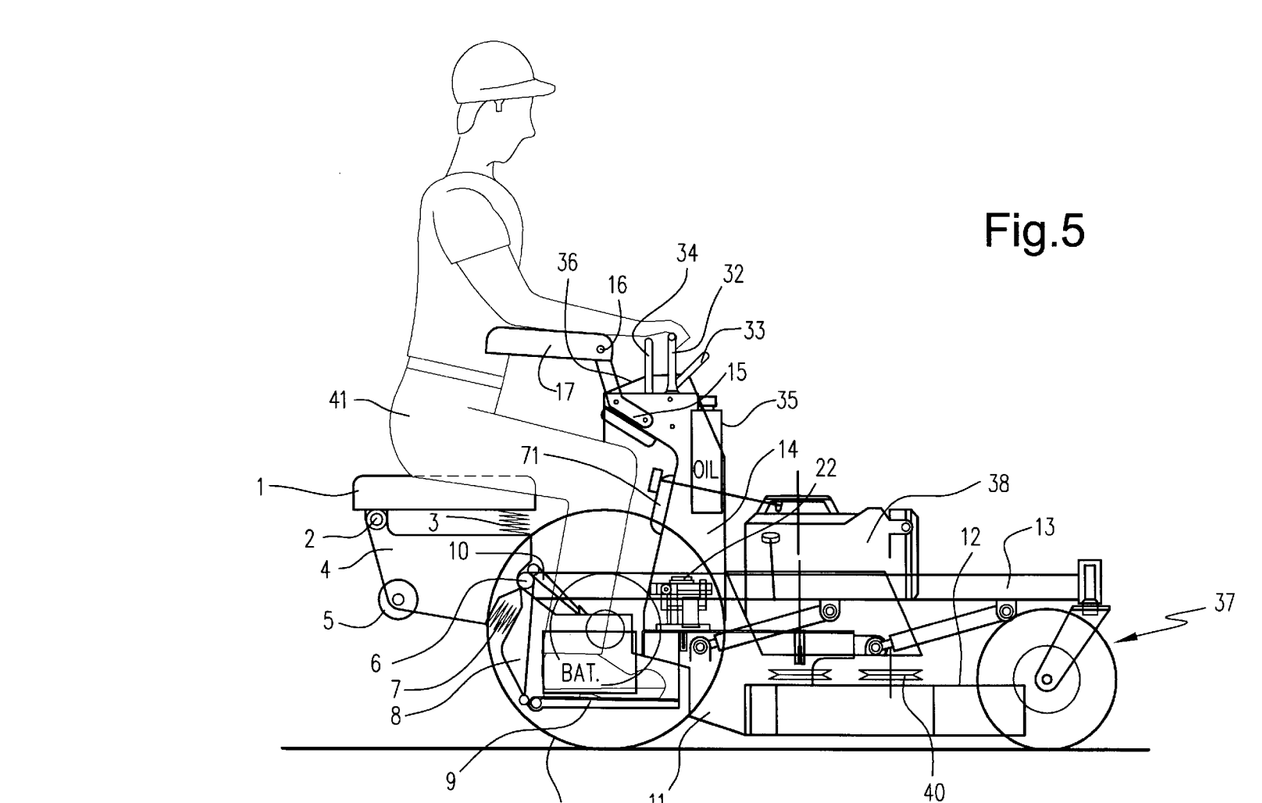
FIG. 5 is a side elevation view of a zero radius turning self-propelled power lawn mower according to another embodiment of this invention, the mower including both standing and sitting modes and this figure showing the operator in a sitting position.
Figure 6:
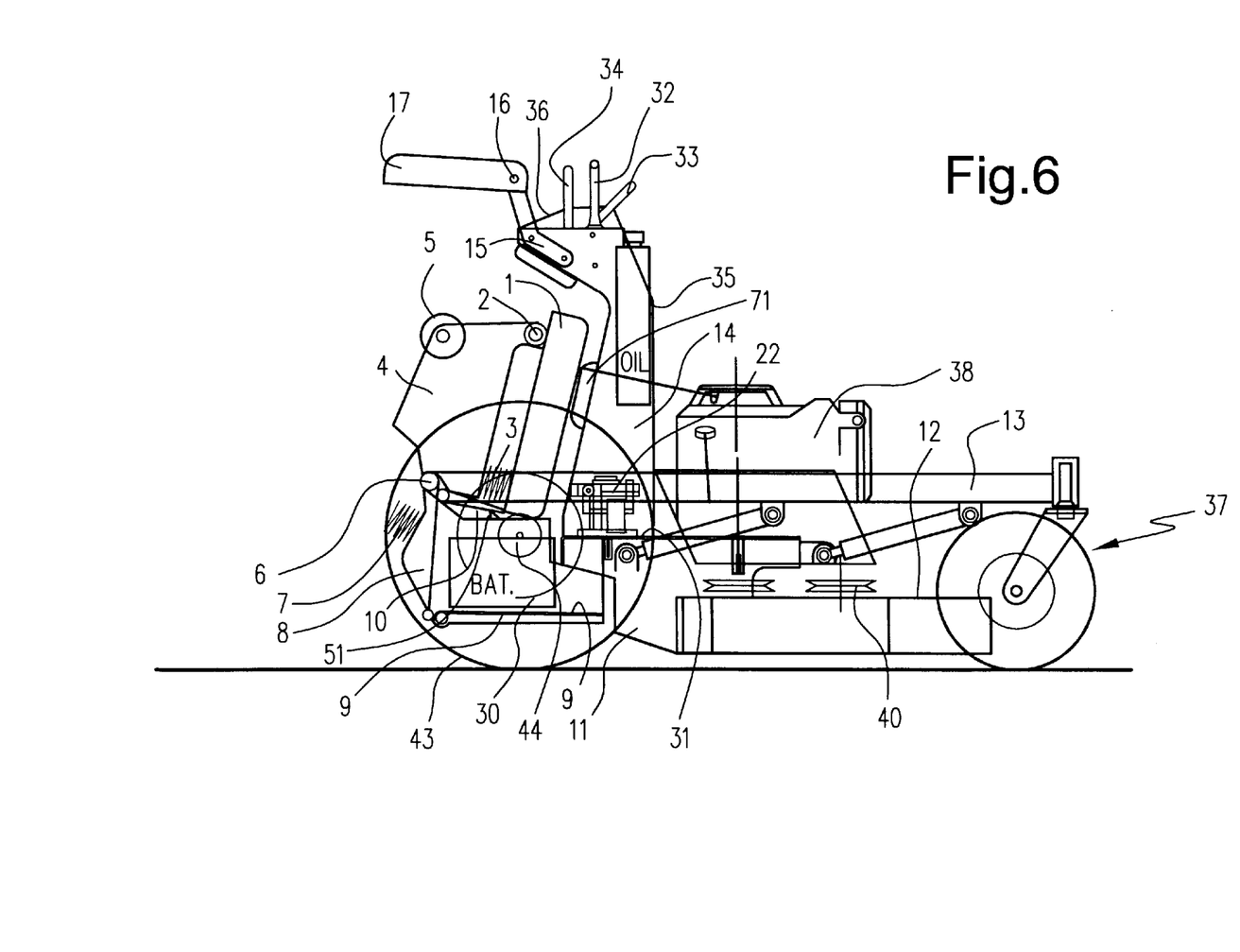
FIG. 6 is a side elevation view of the mower of FIG. 5, showing the seat folded up absent an operator.

FIGS. 5–6 illustrate a self-propelled zero radius turning power mower according to yet another embodiment of this invention. The FIGS. 5–6 embodiment differs from the FIGS. 1–4 and 8 embodiment, in that in the FIGS. 5–6 embodiment seat 1 is generally flat and does not have a back portion. FIG. 5 illustrates seat 1 in a deployed position with the operator sitting on the mower. FIG. 6 illustrates seat 1 in a folded up or stowed position, with seat 1 and support 4 having been rotated clockwise about pivot axis 6.

In certain embodiments herein, pad or cushion 71 may be mounted on a rear surface or edge of side supports 14 so as to cushion the knees of the operator against banging into supports 14, and/or to provide a rest up against which seat 1 can contact in a stowed position.

Once given the above disclosure, therefore, various other modifications, features, and/or improvements will become apparent to the skilled artisan. Such other features, modifications, and improvements are thus considered a part of this invention, the scope of which is to be determined by the following claims.

We claim:

1. A zero radius turning self-propelled lawn mower comprising:

an engine for powering the mower;

first and second rear drive wheels each independently driveable in forward and reverse directions so as to allow for approximate zero radius turning of the mower about a vertical turning axis disposed between said rear drive wheels when said first rear drive wheel is driven forward and said second rear drive wheel is driven rearward at approximately the same speed;

a foot platform for supporting a standing operator, wherein at least a portion of said foot platform is located forward of a rear edge of one of said rear drive wheels;

a seat structure for supporting a sitting operator, wherein at least a portion of said seat is located rearward of said vertical turning axis;

wherein said seat structure is pivotal about a first pivot axis located at an elevation above a rotational axis of at least one of said drive wheels so that said seat structure may be folded up from a deployed position to a stowed position;

wherein the operator may operate the mower when in a sitting position on said seat structure and when in a standing position on said foot platform; and wherein said seat structure is pivotal about said first pivot axis so that said seat can be folded up from the deployed position to the stowed position without moving said foot platform.

2. The mower of claim 1, wherein said vertical turning axis intersects said foot platform.

3. The mower of claim 1, further comprising a handle control assembly including a hand grip portion, and wherein said hand grip portion may be located forward of said vertical turning axis during mower operation; and wherein said foot platform is located relative to said hand grip portion so that at least a portion of the operator's body when standing on the platform may be located substantially on the vertical turning axis.

4. The mower of claim 3, wherein the foot platform is located relative to said hand grip portion so that the operator when standing on the foot platform may be substantially unaffected by centrifugal force created during approximate zero radius turns of the mower.

5. The mower of claim 1, wherein said seat structure includes a seat and a seat support, said seat support for supporting said seat.

6. The mower of claim 5, wherein said seat is normally located rearward of said vertical turning axis during mower operation when the operator is sitting on said seat.

7. The mower of claim 5, wherein said seat support is pivotally connected to a frame of the mower via said first pivot axis.

8. The mower of claim 7, wherein said seat is pivotally connected to said seat support via a second pivot axis, said first and second pivot axes being approximately parallel to one another.

9. The mower of claim 8, further comprising a first biasing means disposed between said seat support and a portion of said seat proximate a front portion of said seat.

10. The mower of claim 9, further comprising a second biasing means for applying a biasing force to said seat support so as to dampen vibration of a rear portion of said seat; and wherein the entire engine is located forward of a front edge of at least one of the rear drive wheels.

11. The mower of claim 10, wherein each of said first biasing means includes a first spring and said second biasing means includes a second spring, and wherein said first spring applies a biasing force to said seat in an approximately vertical direction while said second spring applies a biasing force to said seat support in a direction angled from the vertical from about 20–80 degrees.

12. The mower of claim 1, further comprising first and second selectively deployable arm rests.

13. The mower of claim 12, further comprising first and second side supports extending upwardly from a deck of the mower, and wherein said first and second arm rests are supported by said first and second side supports.

14. The mower of claim 13, wherein said first and second side supports further support a hydraulic oil tank, a console, and a handle control assembly including a bar, first and second right hand pivotal steering levers disposed on opposite sides of said bar, and first and second left hand pivotal steering levers disposed on opposite sides of said bar.

15. The mower of claim 1, further comprising a handle control assembly including at least one right hand steering lever and at least one left hand steering lever, and wherein a first cable extends between said right hand steering lever and a first pump and a second cable extends between said left hand steering lever and a second pump, and wherein said first pump controls drive speed and direction of said first rear drive wheel and said second pump controls drive speed and direction of said second rear drive wheel.

16. The mower of claim 1, wherein said first pivot axis is located rearward of said vertical turning axis, and wherein said operator may operate the mower in a standing position when standing on the platform even when the seat has been folded up to its stowed position.

17. A zero radius turning self-propelled lawn mower comprising:

an engine for powering the mower;

first and second rear drive wheels each independently driveable in forward and reverse directions so as to allow for approximate zero radius turning of the mower about a vertical turning axis disposed between said rear drive wheels when said first rear drive wheel is driven forward and said second rear drive wheel is driven rearward at approximately the same speed;

a foot platform for supporting a standing operator, wherein at least a portion of said foot platform is located forward of a rear edge of one of said rear drive wheels;

a seat structure for supporting a sitting operator, wherein at least a portion of said seat is located rearward of said vertical turning axis;

wherein said seat structure is pivotal about a first pivot axis so that said seat structure may be folded up from a deployed position to a stowed position;

wherein the operator may operate the mower when in a sitting position on said seat structure and when in a standing position on said foot platform; and operator presence control (OPC) means associated with each of said foot platform and a handle control assembly, said OPC means for causing at least blades of the mower to shut down when it is detected that the operator has stepped off of the platform and taken his or her hands off of said handle control assembly.

18. A self-propelled lawn mower comprising:

an engine for powering the mower;

first and second drive wheels;

a foot platform for supporting a standing operator;

a seat for supporting a sitting operator;

wherein said seat is selectively deployable from a folded up stowed position to a deployed position, said deployed position being a position where said seat is adapted to support the sitting operator;

wherein the operator may operate the mower when in a sitting position on said seat and when in a standing position on said foot platform; and wherein said seat is selectively deployable from the folded up stowed position to the deployed position so that the position of the foot platform is not changed when said seat is moved from the folded up stowed position to the deployed position.

19. The mower of claim wherein said first and second drive wheels are rear drive wheels;

wherein said platform is at least partially forward of a rotational axis of one of said drive wheels and at least partially rearward of said rotational axis of said one of said drive wheels; and wherein said seat is an integral part of the mower and not simply an attachment thereto.

20. The mower of claim 19, wherein said seat is at least partially located behind said rear drive wheels, and wherein the mower further comprises at least two biasing means for applying biasing force to said seat for operator comfort during mower operation.

* * * * *

UNITED STATES PATENT AND TRADEMARK OFFICE
CERTIFICATE OF CORRECTION

PATENT NO. : 6,205,753 B1 Page 1 of 1
DATED : March 27, 2001
INVENTOR(S) : Velke et al.

It is certified that error appears in the above-identified patent and that said Letters Patent is hereby corrected as shown below:

Column 12,
Line 4, after "claim", insert -- 18, --.

Signed and Sealed this

Twenty-eighth Day of August, 2001

Attest:

*Nicholas P. Godici*

NICHOLAS P. GODICI
*Attesting Officer* *Acting Director of the United States Patent and Trademark Office*